J. M. MORSE.
Wheel-Cultivator.
No. 69,468.                    Patented Oct. 1. 1867.
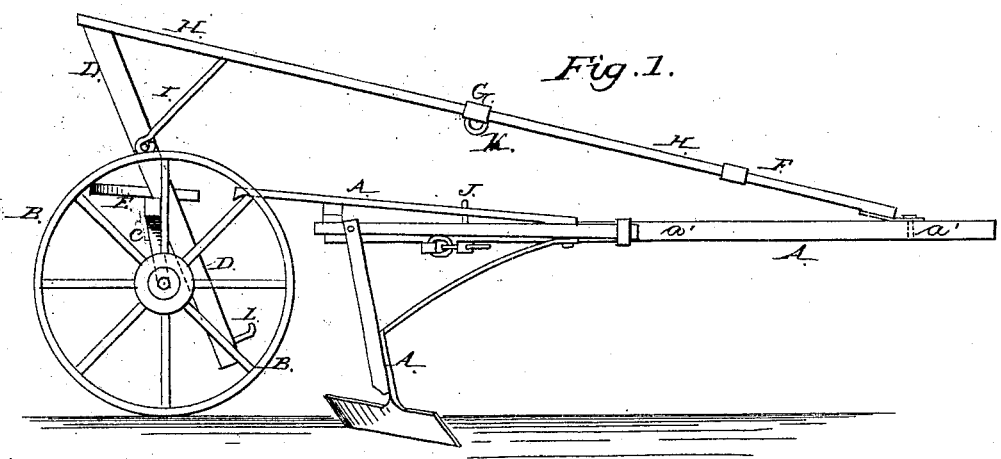
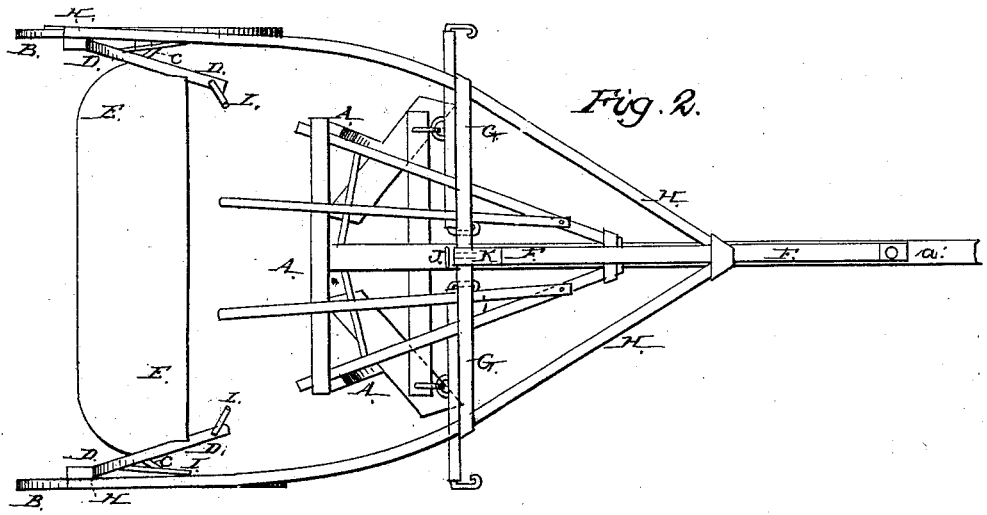
Witnesses:
Thos. Fusche
Alex T. Roberts
Inventor:
J. M. Morse
Per Munn & Co.
Attorneys

United States Patent Office.

J. MADISON MORSE, OF SANDWICH, ILLINOIS.

Letters Patent No. 69,468, dated October 1, 1867.

---

IMPROVEMENT IN CULTIVATORS.

---

The Schedule referred to in these Letters Patent and making part of the same.

---

TO ALL WHOM IT MAY CONCERN:

Be it known that I, J. MADISON MORSE, of Sandwich, in the county of De Kalb, and State of Illinois, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a side view of my improved cultivator.

Figure 2 is a top or plan view of the same.

Similar letters of reference indicate corresponding parts.

My invention has for its object to furnish an improved attachment for corn-cultivators, by means of which the driver may be enabled to ride, which at the same time shall have a tendency to prevent the cultivator from "jumping" or "bounding," and which may be easily and quickly attached and detached; and it consists in the combination of a cart and frame with the cultivator, said cart and frame being constructed and attached in the manner hereinafter more fully described.

A represents a cultivator of the kind known as the "gopher" or "corn-scraper," about the construction of which there is nothing new. B are the wheels of the cart. C is the axle, which is made in the form of a double crank, so that the middle or horizontal part of said axle may be at such a height above the surface of the ground that it may be in no danger of breaking the plants as it passes over them. To the sides of the axle C, near its ends, are attached the standards D, the upper ends of which are inclined a little outward. E is the seat, which is attached to the middle or horizontal part of the axle C, and the ends of which rest against the standards D, so as to brace and strengthen them. F is the tongue or central bar of the frame, the forward end of which is pivoted to the tongue $a'$ of the cultivator. The length of the bar or tongue F is immaterial, but I prefer to make it long so that it may be pivoted to the tongue $a'$ of the cultivator, near its forward end, as tending to make the machine work more satisfactory. The rear end of the tongue F is securely attached to the cross-bar G, to the ends of which are attached the longitudinal bars H of the frame. The rear ends of the bars H are securely attached to the upper ends of the standards D, and are strengthened by the braces I. The forward ends of the bars H are attached to the tongue or central bar F. This construction causes the bars H to incline or curve inward as they pass from the said standards to the said tongue, as shown in fig. 2. J is a hook, attached to the cultivator-frame, which hooks into an eye or staple, K, attached to the rear part of the tongue F, so as to support the cultivator above the surface of the ground, for convenience in turning, or passing from field to field. To the lower ends of the standards D are attached pins or stirrups L, to form foot-rests for the driver when operating the cultivator A. By this construction the cart and frame may be detached from the cultivator by simply removing the screw-bolt by which the forward end of the tongue or bar F is pivoted to the tongue of the cultivator.

My improvement has been described as being used in connection with the gopher or corn-scraper, but it is equally applicable to shovel or other corn-cultivators.

I claim as new, and desire to secure by Letters Patent—

The combination of the cart and frame B C D E F G H, constructed and arranged substantially as described, with an ordinary corn-cultivator, as and for the purpose herein set forth.

The above specification of my invention signed by me this 6th day of August, 1867.

J. MADISON MORSE.

Witnesses:
W. H. LEWIS,
JOSEPH A. DICKSON.